United States Patent [19]

Volker et al.

[11] Patent Number: 4,537,043
[45] Date of Patent: Aug. 27, 1985

[54] PROCEDURE FOR CREATING AN INERT GAS ATMOSPHERE WITH CONSTANT COMPOSITION OF NITROGEN AND CARBON DIOXIDE IN A REFRIGERATED CONTAINER

[75] Inventors: Wolfgang Volker, Tönisvorst; Hendrik Glastra, Enschede, both of Fed. Rep. of Germany

[73] Assignee: Messer Griesheim GmbH, Fed. Rep. of Germany

[21] Appl. No.: 612,583

[22] Filed: May 21, 1984

[30] Foreign Application Priority Data

May 27, 1983 [DE] Fed. Rep. of Germany ....... 3319249

[51] Int. Cl.³ .............................................. B60H 3/04
[52] U.S. Cl. .......................................... 62/239; 62/50; 62/78; 220/88 B
[58] Field of Search ............................ 62/50, 78, 239; 220/88 B

[56] References Cited

U.S. PATENT DOCUMENTS

| | | | |
|---|---|---|---|
| 2,479,840 | 8/1949 | Johnson et al. | 62/239 |
| 2,881,600 | 4/1959 | Elfving | 62/239 |
| 3,102,777 | 9/1963 | Bedrosian et al. | 62/78 |
| 3,628,347 | 12/1971 | Puckett | 62/50 |

*Primary Examiner*—Ronald C. Capossela
*Attorney, Agent, or Firm*—Connolly and Hutz

[57] ABSTRACT

An inert gas atmosphere of nitrogen and carbon dioxide is created in a refrigerated container having a diesel engine. A lower oxygen content is maintained by an oxygen limit control while the nitrogen is led into the interior of the container from a gas bottle connected with the container when the predetermined oxygen limit value is exceeded. While the inert gases are being supplied, a constant flow of cold gaseous nitrogen is produced by an electrical evaporator in the liquid nitrogen storage tank and connected to the generator of the diesel engine while carbon dioxide is removed from the gas bottle, heated, released to a constant pressure and fed into the container via throttle points constituting a parallel-switched group of such throttle points which can be individually activated.

9 Claims, 2 Drawing Figures

PROCEDURE FOR CREATING AN INERT GAS ATMOSPHERE WITH CONSTANT COMPOSITION OF NITROGEN AND CARBON DIOXIDE IN A REFRIGERATED CONTAINER

BACKGROUND OF INVENTION

The invention concerns a procedure for creating an inert gas atmosphere with constant composition of nitrogen and carbon dioxide in a refrigerated container which is equipped with a diesel engine and a refrigerator and in which a low oxygen content is maintained by means of a limit value control for oxygen.

It is known from several scientific investigations that agricultural produce and animal products, as well as flowers and plants can be stored much longer in a fresh condition in cooled rooms, if the natural atmosphere is replaced with an inert gas atmosphere of nitrogen and carbon dioxide. In most cases a low oxygen content is also advantageous. The optimum gas mixture compositions for the individual products vary, but in general, it can be stated that the contents of carbon dioxide and oxygen are low, amounting to a maximum of ten percent by volume. It is only in the case of transport of fresh meat that the carbon dioxide content may advantageously be increased to fifteen percent by volume.

In large stationary storage rooms, such inert gas atmospheres can be created and maintained with relative ease, since trained personnel is available in these places. However, it is also desirable that similar inert gas atmospheres could be maintained in refrigeration containers for the transport of such agricultural products as well. There has been no lack of attempts in this direction. So, for instance, U.S. Pat. No. 3,269,133 shows a refrigerated container to which a storage container for liquid nitrogen and a gas bottle for carbon dioxide are attached on the outside. Lines lead from these storage containers into the interior of the container. The oxygen contents in the atmosphere are analyzed by means of an oxygen measurement device. When the oxygen content is too high due to air penetrating through leakages in the walls, a control impulse is generated for feed of gaseous nitrogen from the liquid nitrogen container. The nitrogen feed is terminated as soon as the preset oxygen range has been reached again. Independently thereof, the carbon dioxide content is monitored by means of a measurement device for carbon dioxide. If the carbon dioxide content sinks below the predetermined value, the carbon dioxide feed from the gas bottle is released by means of control impulses until the predetermined carbon dioxide content has again been reached. Refrigerated containers have also been used, where the containers for nitrogen and carbon dioxide are located in separate compartments in the interior of the container, as are the refrigerator, the diesel engine and the fuel tank. The standard outside dimensions of the container may be maintained for such arrangements which is a great advantage particularly for the transport. However, measurement and control of the carbon dioxide content have been found unsatisfactory. While there exists a whole series of proven and robust devices for measurement and control of the oxygen content, the corresponding devices for carbon dioxide are complicated and susceptible to malfunction. While this may be acceptable in stationary installations, since trained personnel can be available, this is not the csse with respect to refrigerated containers. In traffic, these are subjected to operational hardships and are serviced by a variety of people with the most varying qualifications. Thus, under practical conditions, refrigerated containers with controlled inert gas atmosphere have not been successfully used.

SUMMARY OF INVENTION

An object of this invention is to find a procedure for the creation, in a refrigerated container, of an inert gas atmosphere with a constant composition of nitrogen, carbon dioxide, and a small quantity of oxygen, whereby it is not necessary to measure and control the carbon dioxide content, and where the total generation of gas mixture of carbon dioxide, nitrogen and oxygen can be obtained by means of an oxygen measurement device.

The procedure according to the invention makes it possible to monitor the inert gas atmosphere in the refrigerated container by means of a device for measurement of oxygen. All separate measurements and controls of the carbon dioxide content is superfluous since when the inert gas is introduced, a predetermined constant ratio of nitrogen and carbon dioxide is led into the refrigerated container. On one hand, this is achieved by means of transforming the liquid nitrogen in the storage container into gaseous nitrogen by means of an electrical evaporator. When the evaporator consumes a constant amount of electrical energy, a constant quantity of nitrogen is evaporated. On the other hand, the purpose is achieved thereby that the carbon dioxide is heated to a predetermined temperature, and a constant pressure is released. This is achieved by means of a common gas heating device and a pressure reduction device. Further outflow of the carbon dioxide through the choke or throttle points occurs against the atmospheric pressure in the container. Since the pressure is constant in front of and behind the throttle points, there is a constant flow of gaseous carbon dioxide through the throttle points. The ratio of the mixture of carbon dioxide and nitrogen is thus determined exclusively by the number of activated throttle points, preferably orifice gauges. A simple serial switch can serve this purpose. In each case, the percentage of admixed carbon dioxide can be indicated on the push-buttons of the serial switch. However, it is also possible to indicate the products for which the push-buttons are to be activated. In a routine operation, the service costs will thus be reduced to the setting of the desired oxygen content at the oxygen measurement device to the activation of a switch for a predetermined carbon dioxide admixture, and to the setting of the desired temperature in the refrigeration area.

Preferably, the storage tank for the liquid nitrogen is operated without pressure. This makes it easier to comply with the international regulations for such tanks. Preferably, the storage tanks are arranged vertically and not horizontally, since construction cost, and consequently also weight, can be reduced with such an arrangement. It should be determined in each individual case if one or more storage tanks should be used. On one hand, the device for inert gas supply should take as little space as possible in the container; on the other hand, the capacity must be sufficiently great for long term inert gas supply. It should last for at least one month. The total inert gas supply device is preferably accommodated in a separate compartment of the container. If this is the case, there must be a ventilation opening not only in the storage area proper but also in the compartment for inert gas supply, so that no unacceptable high pressure can be accumulated. When inert gas is introduced, the excess gas with too high oxygen content escapes through the ventilation opening in the storage area.

For economical operation, it is necessary that the container is well insulated and has as few leaks as possible, through which the outside air can penetrate into the interior of the container. The quantity of outside air penetrating through such leaks determines the inert gas consumption, since the penetration of outside air increases the oxygen content until the pre-set limit value is exceeded and the inert gas feed begins.

THE DRAWINGS

DETAILED DESCRIPTION

Figure 1:
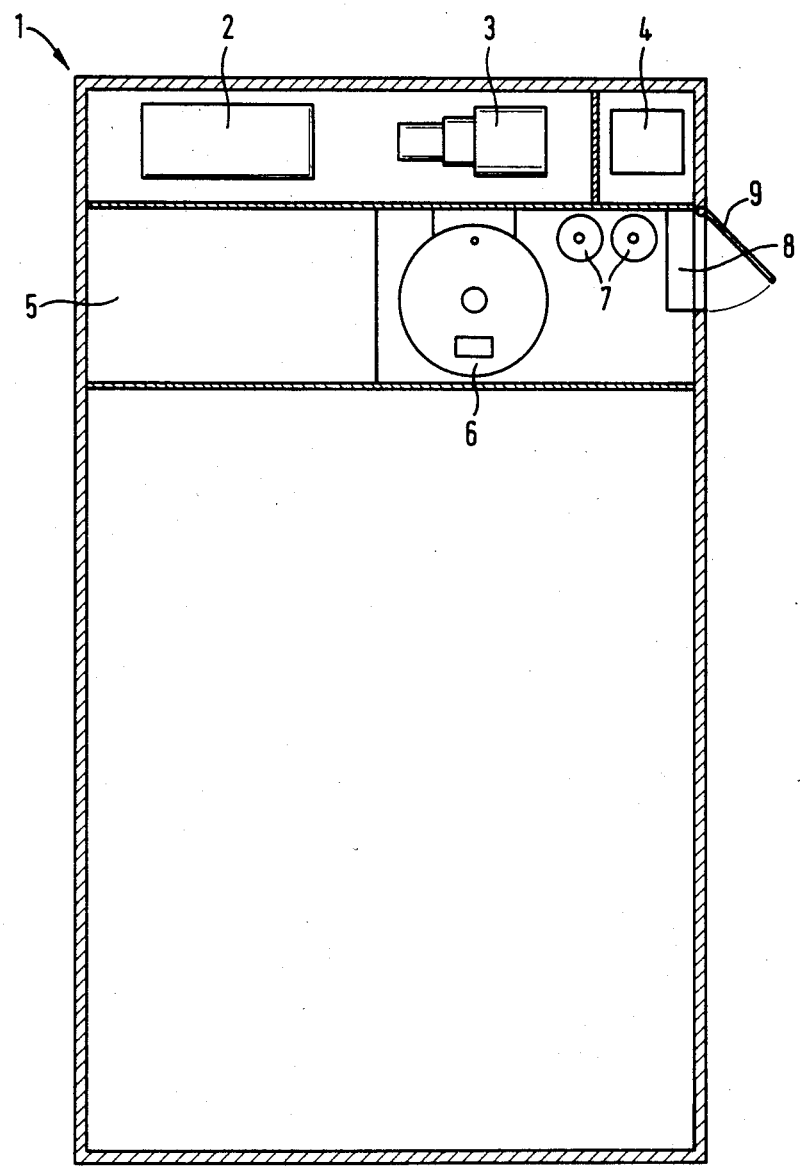
FIG. 1 is an exploded view in section of a container with inert gas supply.

The exploded view in FIG. 1 of a container 1 shows a separate compartment in which a refrigerator 2, a diesel engine 3 for power generation, and an oxygen measurement device 4 for control of the oxygen are arranged in one area; while a tank 5 for diesel oil, a storage tank 6 for liquid nitrogen, gas bottles 7 for carbon dioxide, and a switch box 8 are installed in another area. The switch box 8 contains all control and switching devices, e.g., control of the level in the storage tank 6, the pressure in the gas bottles 7, the main switch, the activation switches for close-off devices, and safety valves, as well as the activation switch for the generation of the inert gas mixture of carbon dioxide and nitrogen according to the invention. After opening the door 9, the compartment is accessible, so that the gas bottles 7 can be exchanged when necessary.

Figure 2:
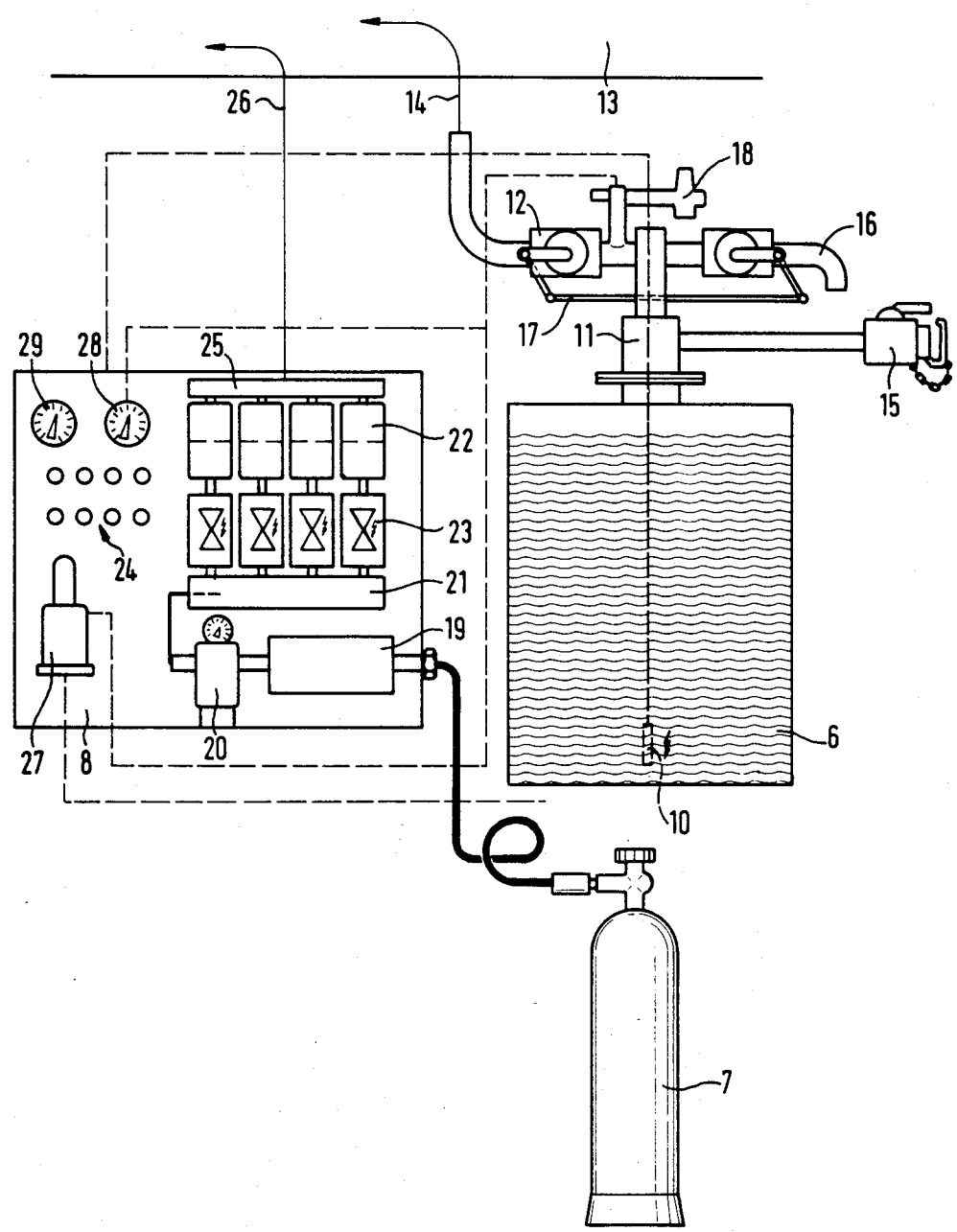
FIG. 2 is a switching device for the inert gas supply.

FIG. 2 shows a switching device for generating the inert gas atmosphere with a constant composition of nitrogen and carbon dioxide according to the invention. Electrical connections are represented as dashed lines and not identified in detail. An electrical evaporator 10 according to the invention is located in the storage tank 6 for liquid nitrogen and is connected to the generator of the diesel engine. When in the heating mode, the electrical generator 10 generates a constant quantity of cold gaseous nitrogen, namely 22 $Nm^3/h$. The evaporated nitrogen 14 arrives into the air circulation flow 13 of the refrigerator via the tank head 11 and the ball cock 12. Its coldness content is thus also utilized for cooling the storage area in the container. The tank outlet 15 and the overflow tap 16 are also located at the tank head 11. When the storage tank 6 is filled, the overflow tap 16 is opened and the ball cock 12 is closed. The situation is exactly the reverse for inert gas operation in the refrigerated container 1. In order to ascertain simultaneous activation of the ball cock 12 and the overflow tap 16, both faucets are activated by means of a parallel displacement 17. A safety valve 18 is located in the tapping line of the tank head 11. The liquid nitrogen in the storage tank 6 is under atmospheric pressure.

Carbon dioxide from the gas bottle 7 is heated in the afterheater 19 and is released to a pressure of 2.5 bar in the pressure reducer 20. Thereafter, it arrives in the distributor 21. According to the invention, four orifice gauges 22 are connected to the distributor and may be switched on or off by means of magnet valves 23. This is done by means of the serial switch 24. The carbon dioxide 26 subsequently arrives into the collector strip 25 and also into the air circulation flow 13 of the refrigerator 2. Since the carbon dioxide undergoes a drop from the constant pressure behind the pressure reducer 20 to the atmospheric pressure in the container 1, the gas flow is dependent only on the cross section of the orifice gauges 22. The four orifice gauges 22 are dimensioned in such a manner that they produce carbon dioxide flows of 0.2, 0.45, 0.9 or 2.0 $Nm^3/h$ in each case together with a simultaneous flow of nitrogen at 22 $Nm^3/h$. The orifice gauges can be combined with one another in any desired manner so that all significant carbon dioxide contents in the nitrogen can be represented. In an extreme case, no orifice gauge 22 at all is opened so that a pure oxygen and nitrogen inert gas atmosphere is maintained in the refrigerated container 1.

Other important instruments in the switch box 8 are the level indicator 27 to show the contents of liquid nitrogen in the storage tank 6, and the manometer 28 to show a potential overpressure in the storage tank 6. The carbon dioxide pressure in the gas bottle 7 is indicated by a manometer 29.

The combination of ball cock 12, overflow tap 16, and parallel displacement 17 may also be replaced with a three-way faucet. Separate ball cocks may also be used if each ball cock is monitored by means of a microswitch. The safety valve 18 is set at a blow-off pressure of 0.3 bar. Its only function is that of gas safety. It is not needed under normal inert gas operation. Fuses to turn off the heating of the electrical evaporator when the content of the liquid nitrogen in the storage tank 6 is too low are also provided but are not represented in the drawing.

Nitrogen and carbon dioxide are always introduced simultaneously and also in constant proportions and constant quantities into the air circulation flow 13. The control impulses for this purpose are generated by the oxygen measurement device 4. Since the oxygen contents are usually very low, the final concentrations of the individual components can be obtained with great precision.

The inert gas conditions can be set in a very simple manner, even by untrained personnel. There are no sensitive systems for the gas dosage. The construction of the installation is robust and allows long maintenance intervals. The switching device contains only standardized parts which can easily be obtained and replaced worldwide in case a repair is required. This creates the possibility of optimal container operation.

SUMMARY

Foods can be stored in perfect condition in refrigerated containers for much longer periods of time if they are stored in an inert gas atmosphere of nitrogen, some carbon dioxide, and oxygen instead of in air. Due to leakage, the oxygen content increases as time passes so that nitrogen must be blown in occasionally from a liquid nitrogen tank connected to the refrigerated container. The control impulses for this purpose are generated by an oxygen measurement device. When needed, carbon dioxide is supplied in the same manner. The carbon dioxide measurement devices required for this purpose are complicated and susceptible to malfunction, therefore very unsuitable for the rough container operations.

In order to avoid these causes of malfunctions, a mixture of nitrogen and carbon dioxide is supplied in a predetermined mix ratio. For this purpose, a constant flow of gaseous nitrogen is generated by means of an electrically heated evaporator 10. Simultaneously carbon dioxide at a specific pressure and at a specific temperature is produced and is released into the refrigerated container by means of orifice gauges 22 which can be individually activated. This one also obtains a constant flow of gaseous carbon dioxide. The quantity of this flow determines the mix ratio and is dependent upon the number of activated orifice gauges (FIG. 2).

What is claimed is:

1. In a process for creating an inert gas atmosphere having a constant composition of nitrogen and carbon dioxide in a refrigerated container equipped with an engine and a refrigerator, the atmosphere having a low oxygen content which is maintained by means of an oxygen limit value control, the nitrogen being led into the interior of the refrigerated container from at least one storage tank for liquid nitrogen which is connected with the refrigerated container, the carbon dioxide being led into the interior off the refrigerated container from at least one gas bottle which is connected with the refrigerated container, the nitrogen and carbon dioxide being supplied when the predetermined oxygen limit value is exceeded; the improvement being that while the inert gases are being supplied, a constant flow of cold, gaseous nitrogen is produced by means of an electrical evaporator located in the storage tank for liquid nitrogen and connected to the generator of the engine, simultaneously with the production of the gaseous nitrogen also removing carbon dioxide from the gas bottle, and heating and releasing the carbon dioxide at a constant pressure and feeding the carbon dioxide into the refrigerated container via at least one throttle point from a parallel-switched group of such throttle points which can be individually activated.

2. Procedure according to claim 1, characterized thereby that the carbon dioxide is led into the refrigerated container via orifice gauges.

3. Procedure according to claim 2, characterized thereby that the flow of cold, gaseous nitrogen is fed into the air circulation flow of the refrigerator.

4. Procedure according to claim 3, characterized thereby that the flow of cold, gaseous nitrogen is removed from a storage tank which is not operated under pressure.

5. Procedure according to claim 4, characterized thereby that the components of the inert gas atmosphere are removed from storage tanks and gas bottles located in the refrigerated container.

6. Procedure according to claim 3, characterized thereby that the components of the inert gas atmosphere are removed from storage tanks and gas bottles located in the refrigerated container.

7. Procedure according to claim 2, characterized thereby that the components of the inert gas atmosphere are removed from storage tanks and gas bottles located in the refrigerated container.

8. Procedure according to claim 1, characterized thereby that the components of the inert gas atmosphere are removed from storage tanks and gas bottles located in the refrigerated container.

9. Procedure according to claim 1, characterized thereby that the flow of cold, gaseous nitrogen is fed into the air circulation flow of the refrigerator.

* * * * *